(12) United States Patent
Goodnow et al.

(10) Patent No.: US 7,249,279 B2
(45) Date of Patent: Jul. 24, 2007

(54) MULTIPROCESSOR CODE FIX USING A LOCAL CACHE

(75) Inventors: Kenneth J. Goodnow, Essex Junction, VT (US); Riyon W. Harding, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 10/707,304

(22) Filed: Dec. 4, 2003

(65) Prior Publication Data

US 2005/0125680 A1 Jun. 9, 2005

(51) Int. Cl.
*G06K 11/00* (2006.01)
(52) U.S. Cl. .......................................... 714/10; 712/37
(58) Field of Classification Search ............... 714/10; 712/37
See application file for complete search history.

(56) References Cited

U.S. PATENT DOCUMENTS

| | | | | |
|---|---|---|---|---|
| 4,542,453 A | * | 9/1985 | Patrick et al. ................. | 714/8 |
| 5,155,819 A | * | 10/1992 | Watkins et al. ............... | 712/36 |
| 5,701,506 A | * | 12/1997 | Hosotani ..................... | 712/37 |
| 5,802,549 A | * | 9/1998 | Goyal et al. ................. | 711/102 |
| 6,049,672 A | * | 4/2000 | Shiell et al. ................. | 717/168 |
| 6,158,018 A | * | 12/2000 | Bernasconi et al. ........... | 714/8 |
| 6,260,157 B1 | * | 7/2001 | Schurecht et al. ............ | 714/8 |
| 7,103,736 B2 | * | 9/2006 | Sachs ......................... | 711/159 |
| 7,111,196 B2 | * | 9/2006 | Balazich et al. .............. | 714/13 |
| 2004/0025087 A1 | * | 2/2004 | Chi ............................ | 714/38 |

* cited by examiner

*Primary Examiner*—Gabriel L. Chu
(74) *Attorney, Agent, or Firm*—Scully, Scott, Murphy & Presser, P.; Michael J. LeStrange

(57) ABSTRACT

Operating code fixes are supplied to multiple processors utilizing the same operating code by storing the correction code fixes in a central RAM, and distributing the code fixes over a dedicated code fix bus to a local cache for each processor. The first processor encountering a code fix requests the code fix from the RAM, which then distributes the code fix over the code fix bus to all of the local caches which are automatically updated with the new code. The system is particularly applicable to an integrated circuit having multiple processors fabricated on a chip, wherein the RAM is on-chip and is connected to an off-chip EEPROM that loads corrected code fixes to the on-chip RAM at power-up.

20 Claims, 4 Drawing Sheets

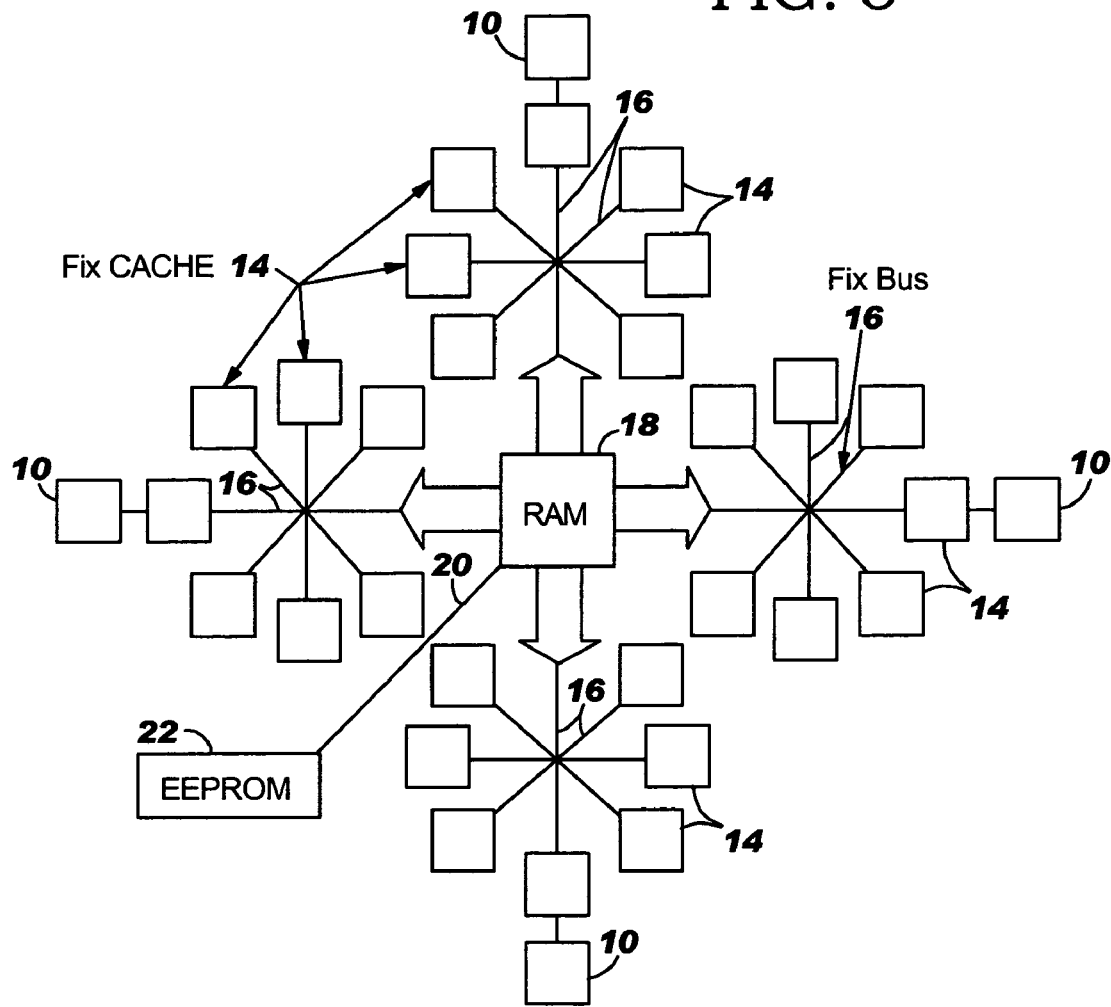

MULTIPROCESSOR CODE FIX USING A LOCAL CACHE

BACKGROUND OF INVENTION

1. Field of the Invention

The present invention relates generally to a multiprocessor code fix using a local cache, and more particularly pertains to a multiprocessor code fix system and method wherein operating code fixes are supplied to the multiple processors which utilize the same operating code by storing the correction code fixes in a central RAM, and distributing the code fixes over a dedicated code fix bus to a local cache for each processor.

2. Discussion of the Prior Art

As ASICs (Application Specific Integrated Circuits) have become larger and more complex, the use of ASICs in microprocessors and other programmable logic has become more common. The code or software that is used to control these programmable devices must be stored in memory during functional operation. The memory used for the storage of the code can be either RAM (Random Access Memory), ROM (Read-Only Memory) or NVRAM (Non-Volatile RAM). Each of these memory structures has its advantages and disadvantages for storage of the operation code. RAM memory allows the user to change the code at any time after manufacturing, however the code still needs to come from somewhere at power-up time since it disappears after each powering off. ROM memory is the smallest and requires the least power to run, however since the code storage is created during manufacturing it is not able to be changed afterward. Thus a bug or problem in the code means that the ASIC must be thrown away. NVRAM memory compromises between RAM and ROM and allows the code to be written into it after manufacturing but retains the code even when no power is applied to the circuit. Unfortunately, the size, speed, and manufacturing cost of nonvolatile RAM is not competitive with ROM and RAM.

FIG. 1 illustrates one practical prior art solution to this code storage problem which uses ROM for the majority of storage, and then place breaks in the code between sections of code that check in a RAM storage area to see if the next section of code is valid. The RAM is loaded at power up from an off chip EEPROM (Electronically Erasable/Programmable ROM). The ROMs inside the ASIC contain jump tables for each section of code. When the ROM reads the first section of code, it is told to jump to a location in the RAM. If the code is OK, the RAM simply sends back a return statement and the code is executed from the ROM.

If, however, there is a bug in the ROM code, as illustrated at addresses/locations 0x100C and 0x1010 which contain bad code, when the ROM reads the first section of code at address 0x1008, and is told by instruction JUMP 0x0FEC to jump to address 0x0FEC in the RAM. The RAM contains the fixed code at the next addresses 0x0FF0, 0x0FF4, 0x0FF8, and thus the processor runs from the new code in the RAM until the end of the section at address 0x0FFC, where the RAM gives the return command to JUMP 0x01024, and execution resumes from address 0x1018 in the ROM. The drawbacks to this method are that it takes time at each powerup for the RAM to load in the fixed code from the EEPROM.

The solution of FIG. 1 optimizes the use of ROM (the smallest and least power usage memory), and uses the smallest amount of RAM requiring loading from power-up. This solution also allows for the possibility that no code changes are needed and no RAM loading required. However, it requires that a small amount of processing time is used for checking the validity, and a small amount of storage space is used for the branching code. One problem is determining the granularity of the breaks and the amount of RAM included in the design. This granularity and RAM storage must be predicted before manufacturing and with no knowledge of the extent of the problems present in the code.

The solution of FIG. 1 works well given the limitations of technology, however as the number of processors on a chip increases, as in chips used in internet processors for example, the amount of RAM for fixes increases and the amount of time or buses required to load the RAM at power-up increases. A typical group of four processors (a square works best since it uses minimal space) requires four times the resources for the bug fixes. If four of these processor groups are then further grouped, the resource demand increases by sixteen.

From a software perspective, there is an additional factor in the use of more processors. Sixteen processors with independent code require sixteen times the software effort. What is effective in many applications is to duplicate the code in all of the processors and to use these processor groups as processing engines for multiple channels of data. For example, a modem can use multiple processors to handle multiple communication channels. This approach limits the amount of software effort required to take advantage of the use of multiple processors.

The problem of code fixes now becomes a case of the same fixes being duplicated over each processor. (The use of a single ROM for the processor becomes intractable as the number and speed of processors increases).

SUMMARY OF INVENTION

The present invention provides a multiprocessor code fix system and method that uses a local cache for each processor wherein operating code fixes are supplied to the multiple processors which utilize the same operating code by storing the correction code fixes in a central RAM, and distributing the code fixes over a dedicated code fix bus to a local cache for each processor.

The present invention provides the following advantages relative to the prior art. It minimizes the amount of RAM required to implement a ROM-jump-patch type of ROM fixing scheme. By having the local caches for the processors all connected to the same fix bus, processors that are running the same code fixes in the same time frame have the code fix already in their local cache. The present invention also eliminates the problem of guessing how much RAM space is required for the fix. A full size RAM could be used as the central fix RAM with the small memory caches holding the local information.

The subject invention also minimizes the amount and time required for loading the fix RAM from external memory.

BRIEF DESCRIPTION OF DRAWINGS

The foregoing objects and advantages of the present invention for a multiprocessor code fix using a local cache may be more readily understood by one skilled in the art with reference being had to the following detailed description of several embodiments thereof, taken in conjunction with the accompanying drawings wherein like elements are designated by identical reference numerals throughout the several views, and in which:

FIG. 3 illustrates an embodiment of the present invention having a plurality of dedicated fix buses and fix caches to capture a corrected code from a RAM.

FIG. 4 illustrates a code example wherein a fix cache contains corrected code, and code is being executed in the processor from a ROM, and when the jump 0x0FEC opcode is executed, the processor goes to its fix cache and begins executing the new code associated with address 0x0FEC, and when the new code is finished executing, the new code directs the processor to resume execution from the ROM.

DETAILED DESCRIPTION

The present invention provides a solution to the problem of code fixes in a system having multiple processors utilizing the same code. The present invention solves the problem of code fixes with multiple processors by storing the correction code in a central RAM and then distributing the code fixes as needed into a local cache for each processor and keeping the remainder of the fix caches coherent in time. This coherency relies on the locality of code operation within the other processors. The first processor encountering a code fix incurs an access time penalty of getting the fix from the RAM, but the remainder of the processors have direct access to the code fix from their own caches which are automatically updated with the new code.

Figure 2:
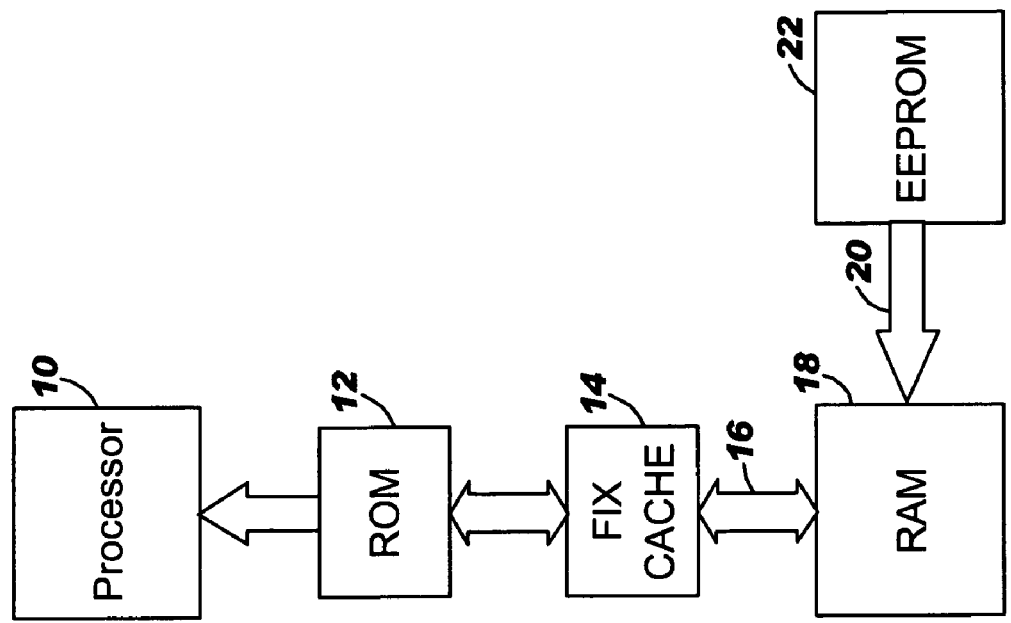
FIG. 2 illustrates an embodiment of the present invention in which each processor of the system is provided with its own ROM and also with a small fix cache which is provided with code fixes distributed from a central RAM.
Figure 1:
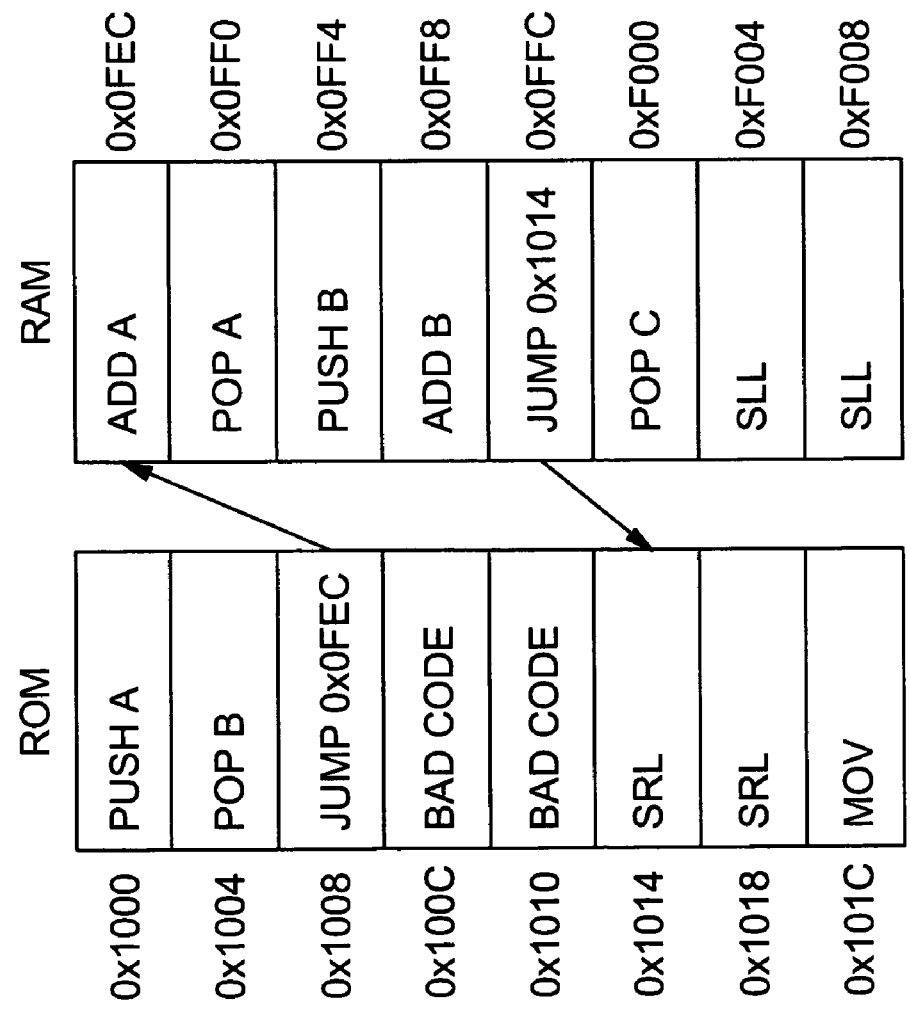
FIG. 1 illustrates one practical prior art solution for code storage which uses ROM for the majority of code storage and places breaks in the code between sections of code that check in a RAM storage area to see if the next section of code is valid.

FIG. 2 illustrates an embodiment of the present invention in which each processor 10 of the system has its own ROM 12 which stores its operating code, and also has a small fix local memory cache 14 which contains or will soon contain the code fixes distributed over a fix bus 16 from a central RAM 18. The concept of a cache is well known in the art, and is a local memory storage area that keeps frequently accessed data or program instructions readily available so that the processor does not retrieve them repeatedly from slow storage. The RAM 18 is loaded at power up from an off chip EEPROM (Electronically Erasable/Programmable ROM) 22 over a bus 20. Assuming during a run operation that not all processors are at the exact same location in the code at the same time and also assuming that the code is about 90% correct in the first place, the problem of code fixes is solved in the present invention by using one or more dedicated fix buses 16 and the fix caches 14 associated with individual processors to capture a corrected code from the RAM 18.

FIG. 3 illustrates an embodiment of the present invention having a plurality of dedicated fix buses 16 and fix caches 14 to capture a correct code from a RAM 18.

Since some RAMs today can have four ports, a system can have four buses 16 on each RAM, as illustrated in FIG. 3, or could have a different number of buses. Each fix bus 30 then supports a certain number of fix caches 14, each associated with an individual processor 10. The RAM 18 is connected by a bus 20 to an off-chip EEPROM 22 that simultaneously loads corrected code to the on-chip fix RAM 18 at power-up. FIG. 3 illustrates a system having one RAM 18 and multiple fix buses 16 serving a multiple number of fix caches 14, each having an associated processor 10, with only a few being illustrated in the drawing.

An embodiment might have a multiple number of RAMs, with each RAM having one or more fix buses which then support a certain number of fix caches. Each RAM would be connected to an off-chip EEPROM that simultaneously loads corrected code to the on-chip fix RAMs at power-up.

When a processor 10 comes to a place in the code where it needs to perform a jump, it goes to its fix cache 14 to see if the new code has been loaded from the fix bus 16. If no other processor has previously called the code, then it would still reside in the RAM 18 and not in its associated fix cache 14. The processor then makes a request to the jump address in the RAM, and this request is then sent to the fix RAM. The RAM then outputs the new code on the fix bus(es). All of the other attached fix caches would also pull off and store the fix data. For processors which had not yet gotten to that place in the code, it will be readily available in their fix cache when they do need it and save time and resources by not having to fetch the new code directly from RAM.

An embodiment of the present invention can implement a least recently used cache algorithm. The fix cache is loaded with new corrected code fixes sequentially every time a new code fix is present on the fix bus, and the cache keeps track of the least recently used code fixes. When there is no longer any room in the fix cache to store additional code fixes, the cache then replaces the least recently used data with a new incoming code fix. A new code fix is fed to each fix cache on the fix bus simultaneously once a processor requests code that is not already resident in its own fix cache.

The least recently used cache algorithm can be implemented using extra tag bits in a bit field attached to each line in the cache. As a cache line is used, the bit field is changed to represent a recent hit or usage. When a new write into the cache is required, the appropriate bit fields of lines in the cache are checked and the line with the least recently used tag setting is chosen to be replaced and written over. The number of lines that are possible for a given address is determined by the number of divisions of the cache or the number of ways, as the use of ways is well known in cache technology. The number of ways would be application dependent.

FIG. 4 illustrates a code example wherein a fix cache 14 contains corrected code. In the example of FIG. 4, code is being executed in the processor 10 from the ROM 12. When the jump 0x0FEC opcode is executed, the processor 10 goes out to its fix cache 14 and begins to execute the code associated with address 0x0FEC. The opcodes in the processor 10 now reflect the new code. When the new code has finished executing, the code resumes from the ROM 12 as seen by the jump 0x1014 opcode located in the fix cache 14.

Figure 5:
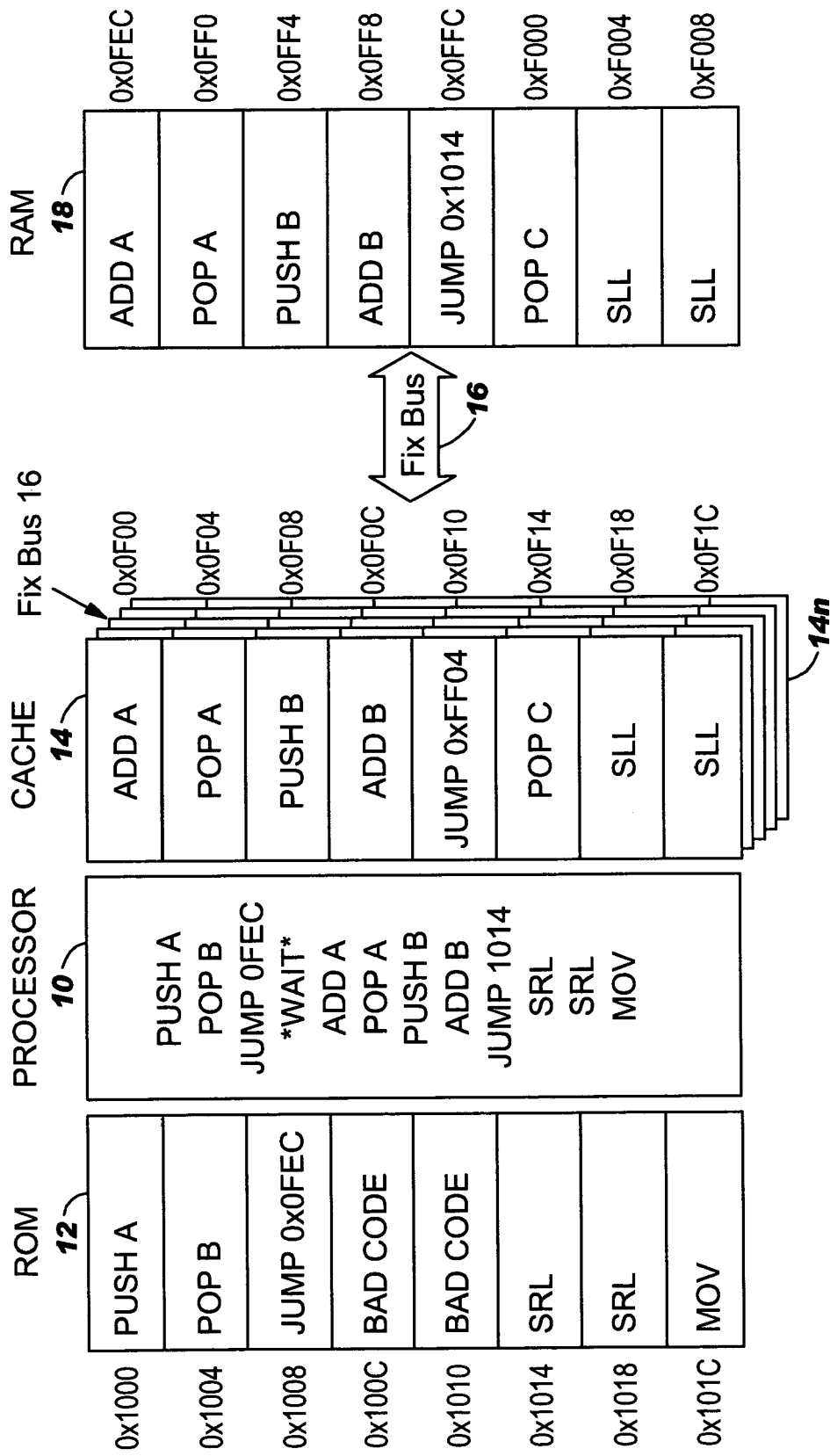
FIG. 5 illustrates a code example wherein the fix cache does not contain corrected code.

FIG. 5 illustrates a code example wherein the cache does not contain corrected code.

In the example of FIG. 5, the corrected code does not reside in the fix cache 14. Here the processor 10 requests the new code from location 0x0FEC from its fix cache 14. The fix cache does not contain that particular code fix and sends a request on the fix bus 16 to the RAM 18 for that section of code. The RAM 18 then sends the necessary op codes up to and including the jump instruction out onto the fix bus 16. From there, all attached fix caches 14 . . . 14n can load the new data into their cache lines where it is available for future use. Fix cache 14 also loads the new code into its cache lines and feeds the data to the processor 10 for execution. When the op code JUMP 0x1014 is executed, execution flow returns back to the ROM 12.

Figure 6:
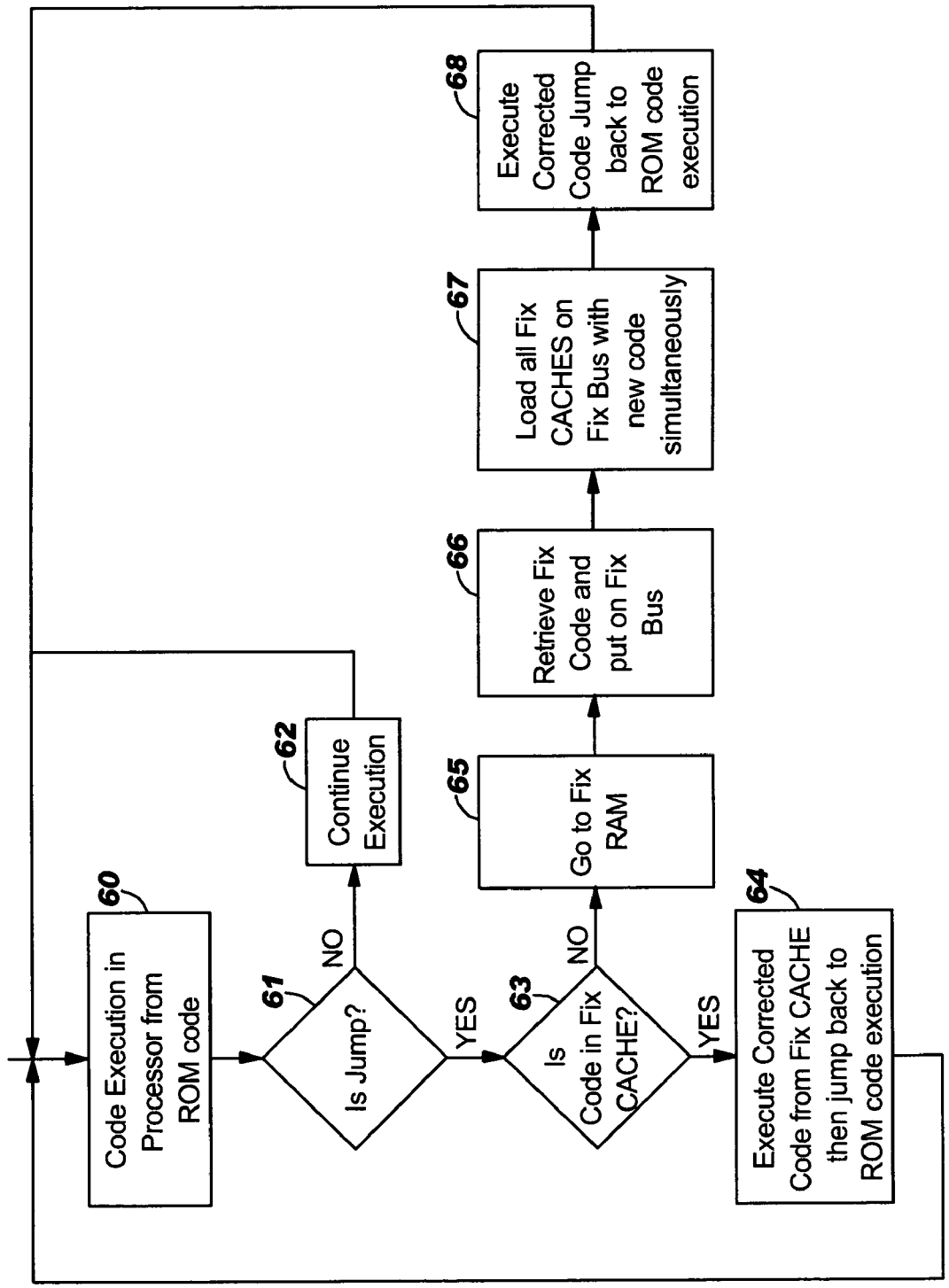
FIG. 6 illustrates a logic flow diagram for code fixes using multiple caches, a fix bus and a fix RAM, and describes the process by which the fix code is executed by the processor.

FIG. 6 illustrates a logic flow diagram for code fixes using multiple local fix caches, at least one fix bus and a fix RAM, and describes the process by which the fix code is executed by the processor. During execution at 60 the processor executes code from the ROM, and examines the code for a jump at 61. If a jump is not encountered at 61 (NO), at 62 the processor continues execution of the ROM code until a jump command is encountered (YES) to a location outside of the ROM. At 63, the processor goes first to its fix CACHE to execute the new code if it exists at that location (YES). If the new code is in the fix cache, at 64 the new code is executed followed by a jump back to ROM execution. If at 63 the new code is not in the fix cache (NO), at 65 the processor goes to the fix RAM and asks for the data at the jump to address. At 66, the fix RAM retrieves the fix code and sends the new code out on the fix bus to the processor, its fix cache and all of the other fix caches on the fix bus. The RAM sends a fixed amount of data (from 1 to n words depending on the architecture and the designer's discretion) onto the fix bus and then waits until it is asked for new data. At 67, the new code is simultaneously loaded into all of the fix caches on the fix bus. At 68, the processor executes the new code until it reaches a jump instruction pointing to an address in ROM, and then continues to execute code from the ROM, and so on.

The advantage of sending a small number of words onto the fix bus is that the RAM is free to deliver other lines of code fixes to other processors running different stages of the software. Additionally, the fix caches themselves can be very small which leaves more real estate on the chip available for other uses.

The present invention provides the following advantages relative to the prior art. It minimizes the amount of RAM required to implement a ROM-jump-patch type of ROM fixing scheme. By having the caches all connected to the same fix bus, processors that are running the same code fixes in the same time frame have the code fix already in their cache. The present invention also eliminates the problem of guessing how much RAM space is required for the fix. A full size RAM could be used as the central fix RAM with the small memory caches holding the local information.

The subject invention also minimizes the amount and time required for loading the fix RAM from external memory.

While several embodiments and variations of the present invention for a multiprocessor code fix using local cache are described in detail herein, it should be apparent that the disclosure and teachings of the present invention will suggest many alternative designs to those skilled in the art.

The invention claimed is:

1. In an integrated circuit having multiple processors with each processor having a ROM (read only memory) for storing operating code for controlling operation of the processor, a system for replacing defective operating code stored in the ROM with replacement code fixes comprising:
   a RAM (random access memory) for storing replacement code fixes to replace the defective operating code;
   a code fix local memory for each of the processors;
   a code fix bus coupled to each of the code fix local memories and the RAM; and
   means for loading the replacement code fixes over the code fix bus into all of the code fix local memories whenever one of the processors encounters a predetermined jump code during execution of the defective operating code.

2. The system of claim 1, wherein each of the multiple processors utilizes the same operating code, and a first processor encountering a code fix requests the code fix from the RAM which distributes the code fix over the code fix bus to the code fix local memories, such that each of the processors has access to the code fix from its own code fix local memory which stores the distributed code fix.

3. The system of claim 1, wherein the RAM is loaded with replacement code fixes from an EEPROM (Electronically Erasable/Programmable ROM) at power-up.

4. The system of claim 1, wherein the integrated circuit is fabricated on a chip and the RAM is on-chip.

5. The system of claim 4, wherein the on-chip RAM is connected to an off-chip EEPROM (Electronically Erasable/Programmable ROM) that loads corrected code fixes to the on-chip RAM at power-up.

6. The system of claim 1, wherein when a processor encounters a predetermined jump code during execution of the defective code, the processor checks its code fix local memory to determine if a replacement code fix has been loaded into its code fix local memory, and if not, the processor then makes a request to the jump address in the RAM, and in response to the request, the RAM outputs the replacement code fix on the code fix bus to all of the code fix local memories which store the replacement code fix.

7. The system of claim 1, wherein the code fix bus is a dedicated code fix bus that only transmits code fixes to the code fix local memories.

8. The system of claim 7, including a plurality of dedicated code fix buses, and wherein the RAM includes four ports and has a dedicated code fix bus coupled to each of the four ports.

9. The system of claim 1, wherein each code fix local memory comprises a code fix local cache.

10. The system of claim 1, wherein each code fix local memory implements a least recently used code fix algorithm wherein when the code fix local memory is loaded with a corrected code fix from the code fix bus, the code fix local memory keeps track of the least recently used code fix, and when there is no room in the code fix local memory to store an additional code fix, the code fix local memory replaces the least recently used code fix with a new code fix received over the code fix bus.

11. A method for replacing defective operating code, for controlling operation of a processor and stored in a ROM (read only memory), with replacement code fixes, in an integrated circuit having multiple processors with each processor having a ROM for storing operating code, the method comprising:
   storing replacement code fixes in a RAM (random access memory) to replace the defective operating code;
   storing replacement code fixes in a code fix local memory for each of the processors coupled by a code fix bus to the RAM; and
   loading the replacement code fixes over the code fix bus into all of the code fix local memories whenever one of the processors encounters a predetermined jump code during execution of the defective operating code.

12. The method of claim 11, wherein each of the multiple processors utilizes the same operating code, and a first processor encountering a code fix requests the code fix from the RAM which distributes the code fix over the code fix bus to the code fix local memories, such that each of the processors has access to the code fix from its own code fix local memory which stores the distributed code fix.

13. The method of claim 11, including loading the RAM with replacement code fixes from an EEPROM (Electronically Erasable/Programmable ROM) at power-up.

14. The method of claim 11, including fabricating the integrated circuit and the RAM on a chip.

15. The method of claim 14, including connecting the on-chip RAM to an off-chip EEPROM (Electronically Erasable/Programmable ROM), and loading corrected code fixes to the on-chip RAM at power-up.

16. The method of claim 11, wherein when a processor encounters a predetermined jump code during execution of the defective code, the processor checks its code fix local memory to determine if a replacement code fix has been loaded into its code fix local memory, and if not, the processor then makes a request to the jump address in the RAM, and in response to the request, the RAM outputs the replacement code fix on the code fix bus to all of the code fix local memories which store the replacement code fix.

17. The method of claim 11, including using a dedicated code fix bus that only transmits code fixes to the code fix local memories.

18. The method of claim 17, including using a plurality of dedicated code fix buses, and wherein the RAM includes four ports, and coupling a dedicated code fix bus to each of the four ports.

19. The method of claim 11, wherein each code fix local memory comprises a code fix local cache.

20. The method of claim 11, including each code fix local memory implementing a least recently used code fix algorithm wherein when the code fix local memory is loaded with a corrected code fix from the code fix bus, the code fix local memory keeps track of the least recently used code fix, and when there is no room in the code fix local memory to store an additional code fix, the code fix local memory replaces the least recently used code fix with a new code fix received over the code fix bus.

* * * * *